US007111082B2

(12) United States Patent
Okahashi

(10) Patent No.: US 7,111,082 B2
(45) Date of Patent: Sep. 19, 2006

(54) LOW NOISE BLOCKDOWN CONVERTER

(75) Inventor: Tetsuhide Okahashi, Kashihara (JP)

(73) Assignee: Sharp Kabushiki Kaisha, Osaka (JP)

(*) Notice: Subject to any disclaimer, the term of this patent is extended or adjusted under 35 U.S.C. 154(b) by 343 days.

(21) Appl. No.: 10/452,578

(22) Filed: Jun. 3, 2003

(65) Prior Publication Data

US 2003/0225945 A1 Dec. 4, 2003

(30) Foreign Application Priority Data

Jun. 3, 2002 (JP) ............................ 2002-161646
Apr. 21, 2003 (JP) ............................ 2003-116042

(51) Int. Cl.
*G06F 13/00* (2006.01)

(52) U.S. Cl. ............................ 710/8; 710/104; 725/62; 725/63

(58) Field of Classification Search ................ 710/1–8, 710/69, 70, 104–106; 455/189.1, 190.1; 725/62–72
See application file for complete search history.

(56) References Cited

U.S. PATENT DOCUMENTS

| | | | | |
|---|---|---|---|---|
| 4,802,239 A * | 1/1989 | Ooto | ....................... | 455/150.1 |
| 6,168,465 B1 * | 1/2001 | Hirota | ....................... | 439/579 |
| 6,189,059 B1 * | 2/2001 | Sotek et al. | ................ | 710/104 |
| 6,211,016 B1 * | 4/2001 | Wu | ............................ | 438/264 |
| 2001/0018716 A1 * | 8/2001 | Marco | ........................ | 709/318 |

FOREIGN PATENT DOCUMENTS

JP 2001-168751 A 6/2001

* cited by examiner

*Primary Examiner*—Christopher Shin
(74) *Attorney, Agent, or Firm*—Birch, Stewart, Kolasch & Birch, LLP

(57) ABSTRACT

The present invention is a low noise blockdown converter (LNB) capable of ensuring sharing of specific information between or among a plurality of microcomputers. In the event that receiver 15 is connected to I/O port 14*c* assigned to slave microcomputer 13, slave microcomputer 13 may receive inquiry or inquiries from receiver 15 for information specific to LNB 11. Upon receiving such inquiry or inquiries, slave microcomputer 13 may, by way of bus 16, request that master microcomputer 12 provide specific information. Upon receiving such request or requests, master microcomputer 12 may, by way of bus 16, provide slave microcomputer 13 with specific information stored in advance at master microcomputer 12. Slave microcomputer 13 may send this specific information from I/O port 14*c* to receiver 15.

19 Claims, 10 Drawing Sheets

(a)

(b)

LOW NOISE BLOCKDOWN CONVERTER

BACKGROUND OF INVENTION

1. Field of Invention

The present invention pertains to a low noise blockdown converter capable of accepting input of one or more signals received by means of one or more substantially parabolic antennas, capable of carrying out frequency conversion on at least one of the received signal or signals, and capable of sending at least one signal produced as a result of this frequency conversion to one or more receivers.

2. Conventional Art

A low noise blockdown converter (hereinafter also referred to as "LNB") of this type, being attached to a feeder horn of a parabolic antenna for use in receiving satellite broadcasts, accepts input of a received signal gathered by the parabolic antenna and guided thereto by the feeder horn. Moreover, this received signal is subjected to frequency conversion, and the signal produced as a result of frequency conversion is sent to a receiver by way of coaxial cable. If, for example, a received signal of several GHz is input thereto, this received signal might be converted to a signal of several MHz which is then sent therefrom.

Furthermore, a high-performance LNB might have microcomputer(s) installed therein. LNB 101 shown in FIG. 9 may have a single microcomputer 104 installed therein, connection of microcomputer 104 to respective receiver(s) 103 being permitted by way of I/O port(s) 102.

Here, the maximum number of I/O ports 102 which microcomputer 104 is capable of accommodating might for example be defined in advance to be two. Accordingly, an LNB 111 having a single I/O port 102 such as that shown in FIG. 10 would have a single microcomputer 104 installed therein. Furthermore, an LNB 121 having four I/O ports 102 such as that shown in FIG. 11 would require that two microcomputers 104 be installed therein. Moreover, if the number of I/O ports 102 is increased, it will be necessary to increase the number of microcomputers 104.

Responsive, for example, to inquiry or inquiries from receiver(s), such LNB microcomputer(s) might return, from I/O port(s) to receiver(s), information specific to the LNB. LNB-specific information might include the serial number of the LNB in question, which might be used for customer support purposes.

Furthermore, where a plurality of microcomputers are installed in the same LNB, it will be necessary for the microcomputers to share information specific to the LNB. Specific information which is identical in content has therefore conventionally been stored in each of a number of microcomputers which have then been installed in the same LNB.

However, where a plurality of microcomputers in which specific information that is identical in content has been stored are to be installed in the same LNB in accordance with the conventional art as described above, it has been necessary to manage the microcomputers as a single set, which has complicated parts control. Alternatively it is sometimes the case that a plurality of microcomputers storing sets of specific information that are respectively different in content are accidentally installed in the same LNB, which fact has resulted in a defective LNB.

Furthermore, separate special-purpose microcomputers might be developed to accommodate each of the several possible numbers of LNB I/O ports, making it possible for a single microcomputer to be installed in a single LNB no matter how many LNB I/O ports there are and eliminating the possibility that any one LNB could receive a plurality of sets of specific information that are mutually different in content. However, in such a case, the increase in the number of types of microcomputers would complicate parts control and would lead to increased microcomputer cost.

SUMMARY OF INVENTION

The present invention was therefore conceived in light of the foregoing conventional problems, it being an object thereof to provide a low noise blockdown converter (LNB) capable of ensuring sharing of specific information between or among a plurality of microcomputers.

In order to achieve the foregoing object and/or other objects, an embodiment of the present invention, in the context of an LNB capable of accepting input of one or more signals received by means of one or more substantially parabolic antennas, capable of carrying out frequency conversion on at least one of the received signal or signals, and capable of sending at least one signal produced as a result of this frequency conversion to one or more receivers, is equipped with a plurality of microcomputers; the plurality of microcomputers comprising one master microcomputer and at least one slave microcomputer; specific information shared by at least a portion of the plurality of microcomputers being stored at the master microcomputer; and at least a portion of the specific information being transferred from the master microcomputer to at least one of the slave microcomputer or microcomputers.

In accordance with the foregoing constitution, because specific information may be stored only in a master microcomputer, such specific information being transferred from master microcomputer to slave microcomputer(s), sharing of specific information between or among a plurality of microcomputers is permitted. It will therefore not be the case that a plurality of microcomputers installed in a single LNB could accidentally come to have specific information stored therein which is different in content.

Furthermore, in an LNB constituted as described above, at least one of the microcomputers may be a flash microcomputer.

What is here referred to as a flash microcomputer is a microcomputer, the data stored within which is capable of being reprogrammed, and which as such permits specific information to be easily written and/or changed. For this reason, if for example all of the microcomputers of the LNB are flash microcomputers, any of them may be used as master microcomputer.

Furthermore, in an LNB constituted as described above, the master microcomputer may be a flash microcomputer, and at least one of the slave microcomputer or microcomputers may be a mask microcomputer.

What is here referred to as a mask microcomputer is a microcomputer, the data within which is stored during the course of manufacture thereof and which does not permit reprogramming of data to be carried out thereafter. While a mask microcomputer may therefore not be used as master microcomputer which would permit specific information to be written therein, it may nonetheless be employed as slave microcomputer. Because mask microcomputers are low in cost, employment of mask microcomputer(s) as slave microcomputer(s) will accordingly permit reductions in cost to be achieved.

Furthermore, in an LNB constituted as described above, responsive to one or more inquiries for specific information from at least one of the receiver or receivers, at least one of the slave microcomputer or microcomputers may accept specific information from the master microcomputer and may send at least a portion of this specific information to at least one of the receiver or receivers inquiring for same.

By thus transferring specific information from master microcomputer to slave microcomputer(s) in response to inquiry or inquiries for same from receiver(s), it is possible to ensure that there will always be agreement with respect to specific information between/among master microcomputer and slave microcomputer(s).

Moreover, in an LNB constituted as described above, responsive to turning ON of power to the LNB, at least one of the slave microcomputer or microcomputers may accept and save specific information from the master microcomputer.

By thus causing specific information to be provided from master microcomputer to slave microcomputer(s) in response to turning ON of LNB power, slave microcomputer(s) is or are able to respond immediately to inquiry or inquiries for specific information from receiver(s).

Moreover, another embodiment of the present invention, in the context of an LNB capable of accepting input of one or more signals received by means of one or more substantially parabolic antennas, capable of carrying out frequency conversion on at least one of the received signal or signals, and capable of sending at least one signal produced as a result of this frequency conversion to one or more receivers, is equipped with a plurality of microcomputers and one or more specific information storage memories in which specific information shared by at least a portion of the plurality of microcomputers is stored; at least a portion of the specific information being transferred from at least one of the specific information storage memory or memories to at least one of the microcomputer or microcomputers.

In an LNB constituted as described above, because specific information may for example be stored in only a single specific information storage memory, the possibility of retaining multiple stored sets of specific information that are mutually different in content can be eliminated. Furthermore, because specific information is transferred to the microcomputer(s) from specific information storage memory or memories, specific information can be shared between or among a plurality of microcomputers.

Furthermore, in an LNB constituted as described above, at least one of the microcomputers may be a mask microcomputer. In such a case, this will eliminate the necessity of storing specific information in each of the microcomputers. As a result, because mask microcomputers may be employed as microcomputers, it will be possible to achieve reductions in cost.

Moreover, in an LNB constituted as described above, responsive to one or more inquiries for specific information from at least one of the receiver or receivers, at least one of the microcomputers may read specific information from at least one of the specific information storage memory or memories and send at least a portion of this specific information to at least one of the receiver or receivers inquiring for same. By thus transferring specific information from specific information storage memory or memories to microcomputer(s) in response to inquiry or inquiries for same from receiver(s), it is possible to ensure that there will always be agreement with respect to specific information between/among microcomputers.

Furthermore, in an LNB constituted as described above, responsive to turning ON of power to the LNB, at least one of the microcomputers may read and save specific information from at least one of the specific information storage memory or memories. By thus causing specific information to be provided from specific information storage memory or memories to microcomputer(s) in response to turning ON of LNB power, microcomputer(s) is or are able to respond immediately to inquiry or inquiries for specific information from receiver(s).

Moreover, another embodiment of the present invention, in the context of a low noise blockdown converter capable of accepting input of one or more signals received by means of one or more substantially parabolic antennas, capable of carrying out frequency conversion on at least one of the received signal or signals, and capable of sending at least one signal produced as a result of this frequency conversion to one or more receivers, is equipped with a plurality of microcomputers, the respective reset terminals of at least a portion of which are connected in common; the plurality of microcomputers comprising one master microcomputer and at least one slave microcomputer; specific information shared by at least a portion of the plurality of microcomputers being stored at the master microcomputer; and responsive to resetting of at least one of the microcomputers, at least a portion of the specific information is transferred from the master microcomputer to at least one of the slave microcomputer or microcomputers.

In an LNB constituted as described above, the fact that reset terminals of microcomputers are connected in common makes it possible for the microcomputers to be made to undergo simultaneous resetting, permitting transfer of specific information from master microcomputer to slave microcomputer(s) to begin promptly in response to resetting of microcomputers. Slave microcomputer(s) can therefore obtain specific information immediately following resetting, making it possible for it or them to respond immediately with specific information in the event that there is or are inquiry or inquiries from receiver(s) for same.

Furthermore, in an LNB constituted as described above, at least one of the microcomputers may be a flash microcomputer.

If, for example, all of the microcomputers of the LNB are flash microcomputers, because it will be possible to easily write specific information to and/or change specific information at any of the microcomputers, any of them may be used as master microcomputer. Furthermore, should it suddenly become necessary to change programming in accompaniment to a change in LNB specifications, this will permit flexible accommodation of such situations.

Moreover, in an LNB constituted as described above, the master microcomputer may be a flash microcomputer, and at least one of the slave microcomputer or microcomputers may be a mask microcomputer.

By thus employing mask microcomputer(s) as slave microcomputer(s), it will be possible to achieve reductions in cost.

Moreover, one or more embodiments of the present invention may be equipped with one or more CR (capacitor-resistor) time constant circuits, at least one of which accepts input of one or more power supply voltages, and at least a portion of the microcomputers may be capable of being reset by at least one output from at least one of the CR time constant circuit or circuits.

Employment of CR time constant circuit(s) permits accomplishment of reductions in cost. But note that the greater the time constant(s) of the CR time constant circuit(s) the greater will be the extent to which any variance in the value(s) of C and/or any variance in the value(s) of R manifest themselves as variance in CR time constant circuit output rise time(s). It is therefore preferred that time constant(s) of CR time constant circuit(s) be made small.

Moreover, an LNB constituted as described above may be equipped with one or more reset ICs (Integrated Circuits), at least one of which accepts input of one or more power supply voltages, and at least a portion of the microcomputers may be capable of being reset by at least one output from at least one of the IC or ICs.

When compared with CR time constant circuit(s), reset IC(s) possess the advantage of permitting more assured resetting of microcomputer(s).

Moreover, another embodiment of the present invention, in the context of a low noise blockdown converter capable of accepting input of one or more signals received by means of one or more substantially parabolic antennas, capable of carrying out frequency conversion on at least one of the received signal or signals, and capable of sending at least one signal produced as a result of this frequency conversion to one or more receivers, is equipped with a plurality of microcomputers and a plurality of reset means for resetting at least a portion of the plurality of microcomputers; the plurality of microcomputers comprising one master microcomputer and at least one slave microcomputer; specific information shared by at least a portion of the plurality of microcomputers being stored at the master microcomputer; and responsive to resetting of at least a portion of the microcomputers by at least a portion of the reset means, at least a portion of the specific information is transferred from the master microcomputer to at least one of the slave microcomputer or microcomputers.

Where it is for example not possible to provide line(s) for connecting reset terminals of microcomputers in common on board(s) on which microcomputers are installed, a plurality of reset means may be arranged on board(s) in distributed fashion, microcomputers being made to undergo resetting as a result of application in distributed fashion of output(s) respectively routed from respective reset means to respective microcomputers.

Furthermore, in one or more embodiments of the present invention, at least a portion of the reset means may respectively be CR time constant circuit or circuits, at least one of which accepts input of one or more power supply voltages; and at least a portion of the microcomputers may be made to undergo resetting as a result of application in distributed fashion of output or outputs respectively routed from at least a portion of the respective CR time constant circuit or circuits to at least a portion of the respective microcomputers.

Employment of CR time constant circuit(s) as reset means permits accomplishment of reductions in cost. But note that the greater the time constant(s) of the CR time constant circuit(s) the greater will be the extent to which any variance in the value(s) of C and/or any variance in the value(s) of R manifest themselves as variance in CR time constant circuit output rise time(s). What this suggests is that this might cause increased disagreement in the timing with which resetting of microcomputers occurs. It is therefore preferred that time constant(s) of CR time constant circuit(s) be made small so as to make small any disagreement in the timing with which resetting of microcomputers occurs.

Moreover, in one or more embodiments of the present invention, at least a portion of the reset means may respectively be equipped with reset IC or ICs, at least one of which accepts input of one or more power supply voltages; and at least a portion of the microcomputers may be made to undergo resetting as a result of application in distributed fashion of output or outputs respectively routed from at least a portion of the respective reset IC or ICs to at least a portion of the respective microcomputers.

When compared with CR time constant circuit(s), reset IC(s) possess the advantage of permitting more assured resetting of microcomputer(s).

Moreover, another embodiment of the present invention, in the context of a low noise blockdown converter capable of accepting input of one or more signals received by means of one or more substantially parabolic antennas, capable of carrying out frequency conversion on at least one of the received signal or signals, and capable of sending at least one signal produced as a result of this frequency conversion to one or more receivers, is equipped with a plurality of microcomputers, the respective reset terminals of at least a portion of which are connected in common, and one or more specific information storage memories in which specific information shared by at least a portion of the plurality of microcomputers is stored; and responsive to resetting of at least one of the microcomputers, at least a portion of the specific information is transferred from at least one of the specific information storage memory or memories to at least one of the microcomputer or microcomputers.

Furthermore, another embodiment of the present invention, in the context of a low noise blockdown converter capable of accepting input of one or more signals received by means of one or more substantially parabolic antennas, capable of carrying out frequency conversion on at least one of the received signal or signals, and capable of sending at least one signal produced as a result of this frequency conversion to one or more receivers, is equipped with a plurality of microcomputers, a plurality of reset means for resetting at least a portion of the plurality of microcomputers, and one or more specific information storage memories in which specific information shared by at least a portion of the plurality of microcomputers is stored; and responsive to resetting of at least a portion of the microcomputers by at least a portion of the reset means, at least a portion of the specific information is transferred from at least one of the specific information storage memory or memories to at least one of the microcomputer or microcomputers.

It is thus also possible to store specific information only in specific information storage memory or memories, and to cause the specific information to be transferred from specific information storage memory or memories to the microcomputer(s) in response to resetting of microcomputer(s).

DESCRIPTION OF PREFERRED EMBODIMENTS

Below, embodiments of the present invention are described in detail with reference to the drawings.

Figure 1:
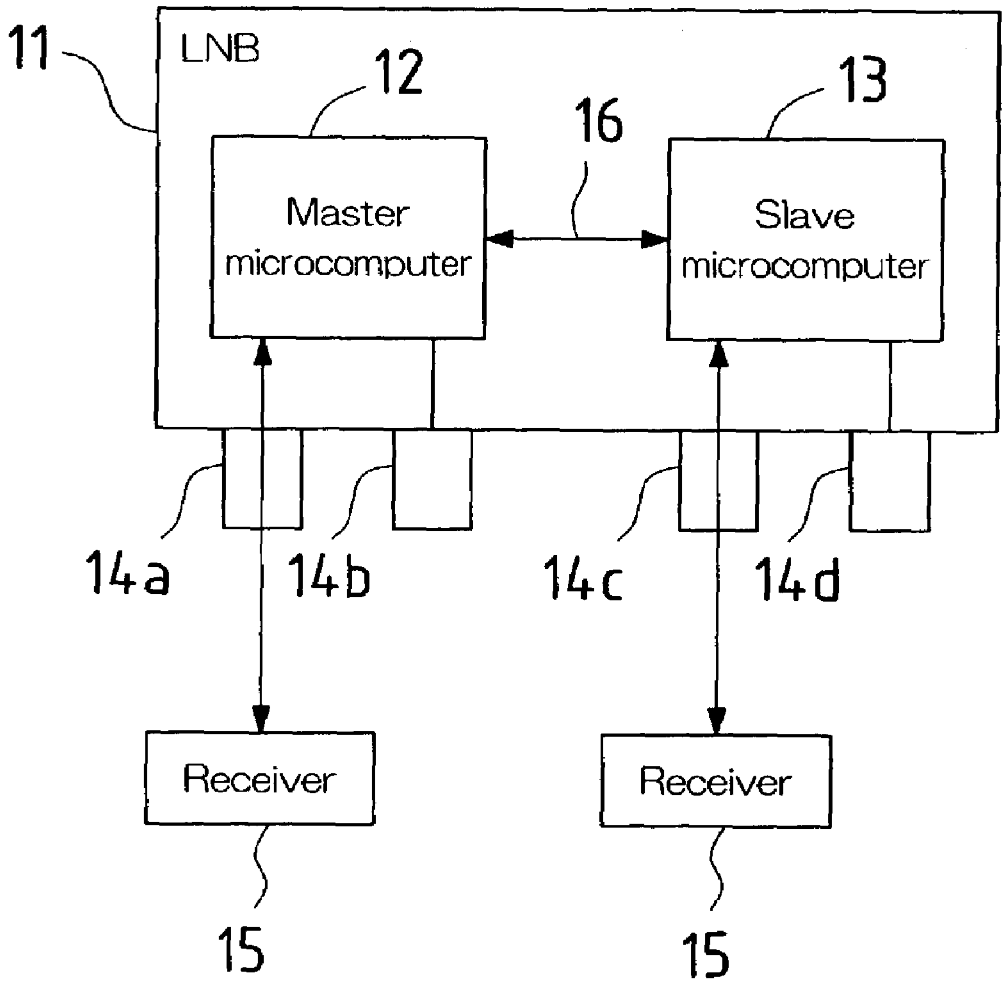
FIG. 1 is a block diagram showing a first embodiment associated with the LNB of the present invention.

FIG. 1 shows in schematic fashion the structure of a low noise blockdown converter in accordance with a first embodiment of the present invention. LNB 11 of the present embodiment is equipped with master microcomputer 12, slave microcomputer 13, and four I/O ports 14*a*, 14*b*, 14*c*, 14*d*.

This LNB 11, being attached to a feeder horn of a parabolic antenna for use in receiving satellite broadcasts, accepts input of a received signal gathered by the parabolic antenna and guided thereto by the feeder horn. In addition, the received signal undergoes frequency conversion, the signal produced as a result of such frequency conversion being sent from respective I/O ports 14*a* through 14*d* to respective receivers 15 by way of respective coaxial cables (not shown).

Furthermore, master microcomputer 12 and slave microcomputer 13 are each capable of accommodating two I/O ports, I/O ports 14*a* and 14*b* being assigned to master microcomputer 12, and I/O ports 14*c* and 14*d* being assigned to slave microcomputer 13.

At LNB 11, master microcomputer 12 is a flash microcomputer, and slave microcomputer 13 is a mask microcomputer.

Here, information specific to LNB 11 is written in advance to master microcomputer 12, which permits data to be easily reprogrammed. Information specific to LNB 11 might include the serial number of the LNB 11, which might be used for customer support purposes. As mentioned above, because mask microcomputers are low in cost, employment of a mask microcomputer as slave microcomputer 13 makes it possible to achieve reductions in the cost of LNB 11.

At LNB 11, if a receiver 15 is for example connected to I/O port 14*c* assigned to slave microcomputer 13, an inquiry from the receiver 15 for information specific to LNB 11 might be received by slave microcomputer 13. Upon receiving such inquiry for specific information, slave microcomputer 13, upon confirming that it does not have information specific to LNB 11, might, by way of bus 16, request that master microcomputer 12 provide such specific information. Upon receiving such request for provision of specific information, master microcomputer 12 might, by way of bus 16, provide slave microcomputer 13 with the specific information stored in advance at master microcomputer 12. Slave microcomputer 13 might send this specific information from I/O port 14*c* to receiver 15.

Similarly, when a receiver 15 is connected to I/O port 14*d*, an inquiry from the receiver 15 for information specific to LNB 11 might be received by slave microcomputer 13, slave microcomputer 13 might request specific information from master microcomputer 12, specific information might be transferred from master microcomputer 12 to slave microcomputer 13, and such specific information might be sent from slave microcomputer 13 to receiver 15 by way of I/O port 14*d*.

Furthermore, if a receiver 15 is connected to either of I/O ports 14*a* and 14*b* assigned to master microcomputer 12, an inquiry from the receiver 15 for information specific to LNB 11 might be received by master microcomputer 12. Upon receiving such inquiry for specific information, master microcomputer 12, upon confirming that it does have information specific to LNB 11, might immediately send such specific information to receiver 15.

Thus, in accordance with LNB 11 of the first embodiment, because specific information is stored only at master microcomputer 12, the possibility of retaining multiple stored sets of specific information that are mutually different in content can be eliminated. Furthermore, because specific information is transferred from master microcomputer 12 to slave microcomputer 13, specific information can be shared between respective microcomputers 12 and 13.

Moreover, the number of slave microcomputers may be increased to two or more in accompaniment to increase in the number of I/O ports. Furthermore, flash microcomputer(s) may be employed for either or both of master microcomputer 12 and slave microcomputer 13. In such a case, it will be possible to use either microcomputer as master microcomputer, and this will moreover permit flexibility in accommodating changes in software. In addition, when electrical power is turned ON at LNB 11, specific information may be transferred from master microcomputer 12 to slave microcomputer 13, specific information being stored in RAM (Random Access Memory) at slave microcomputer 13. Notwithstanding the fact that slave microcomputer 13 is a slave microcomputer, this will make it possible for slave microcomputer 13 to respond immediately to inquiry or inquiries for specific information from receiver(s) 15.

Figure 2:
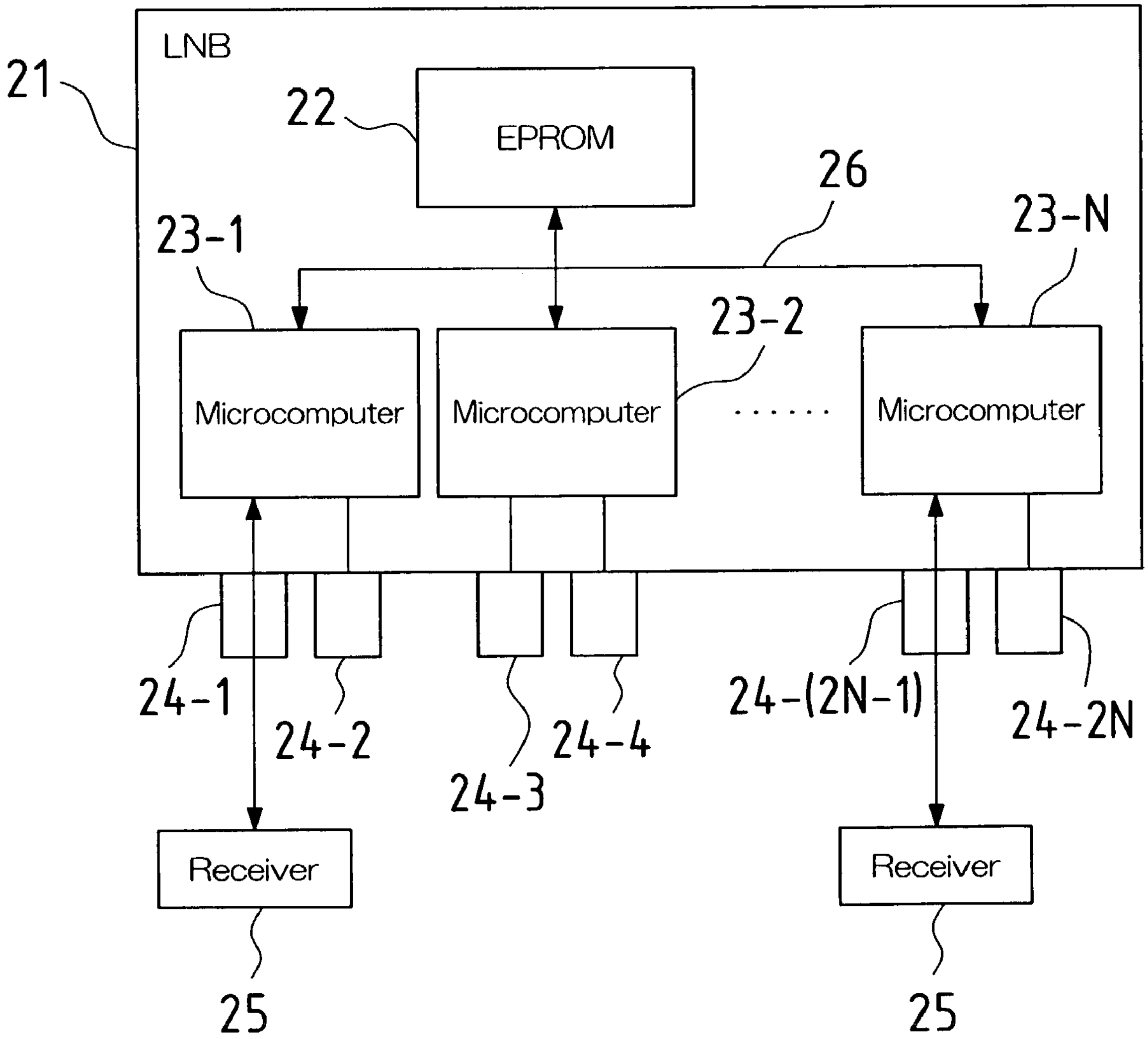
FIG. 2 is a block diagram showing a second embodiment associated with the LNB of the present invention.

FIG. 2 shows in schematic fashion the structure of an LNB in accordance with a second embodiment of the present invention. LNB 21 of the present embodiment is equipped with EPROM (Erasable and Programmable Read Only Memory) 22; microcomputers 23-1 through 23-N, these being N in number; and I/O ports 24-1 through 24-2N, these being 2N in number.

This LNB 21 is also attached to a feeder horn of a parabolic antenna for use in receiving satellite broadcasts, the received signal undergoing frequency conversion, and the signal produced as a result of such frequency conversion being sent from respective I/O ports 24-1 through 24-2N to respective receivers by way of respective coaxial cables (not shown).

Information specific to LNB 21 is written in advance to EPROM 22. Information specific to LNB 21 might include the serial number of LNB 21.

Furthermore, each of microcomputers 23-1 through 23-N is respectively assigned two of I/O ports 24-1 through 24-2N. These microcomputers 23-1 through 23-N are mask microcomputers. This permits reductions in the cost of LNB 21 to be achieved.

At LNB 21, if a receiver 25 is for example connected to I/O port 24-1 assigned to microcomputer 23-1, an inquiry from the receiver 25 for information specific to LNB 21 might be received by microcomputer 23-1. Upon receiving such inquiry for specific information, microcomputer 23-1 might access EPROM 22 by way of bus 26, read such specific information from EPROM 22, and send such specific information from I/O port 24-1 to receiver 25.

Similarly, where receiver 25 is connected to another I/O port, if an inquiry from the receiver 25 for information specific to LNB 21 is received by another microcomputer, the other microcomputer might access EPROM 22, such specific information might be read from EPROM 22, and such specific information might be sent from the other microcomputer to receiver 25 by way of the other I/O port.

Thus, in accordance with LNB 21 of the second embodiment, because specific information is stored only at EPROM 22, the possibility of retaining multiple stored sets of specific information that are mutually different in content can be eliminated. Furthermore, because specific information is transferred from EPROM 22 to respective microcomputers, specific information can be shared between or among the respective microcomputers.

Moreover, flash microcomputers may be employed for microcomputers 23-1 through 23-N. Doing so will permit flexibility in accommodating changes in software. Furthermore, when electrical power is turned ON at LNB 21, specific information may be transferred from EPROM 22 to respective microcomputer(s), specific information being stored in RAM at respective microcomputer(s). This will make it possible for any of the respective microcomputer(s) to respond immediately to inquiry or inquiries for specific information from receiver(s).

Figure 3:
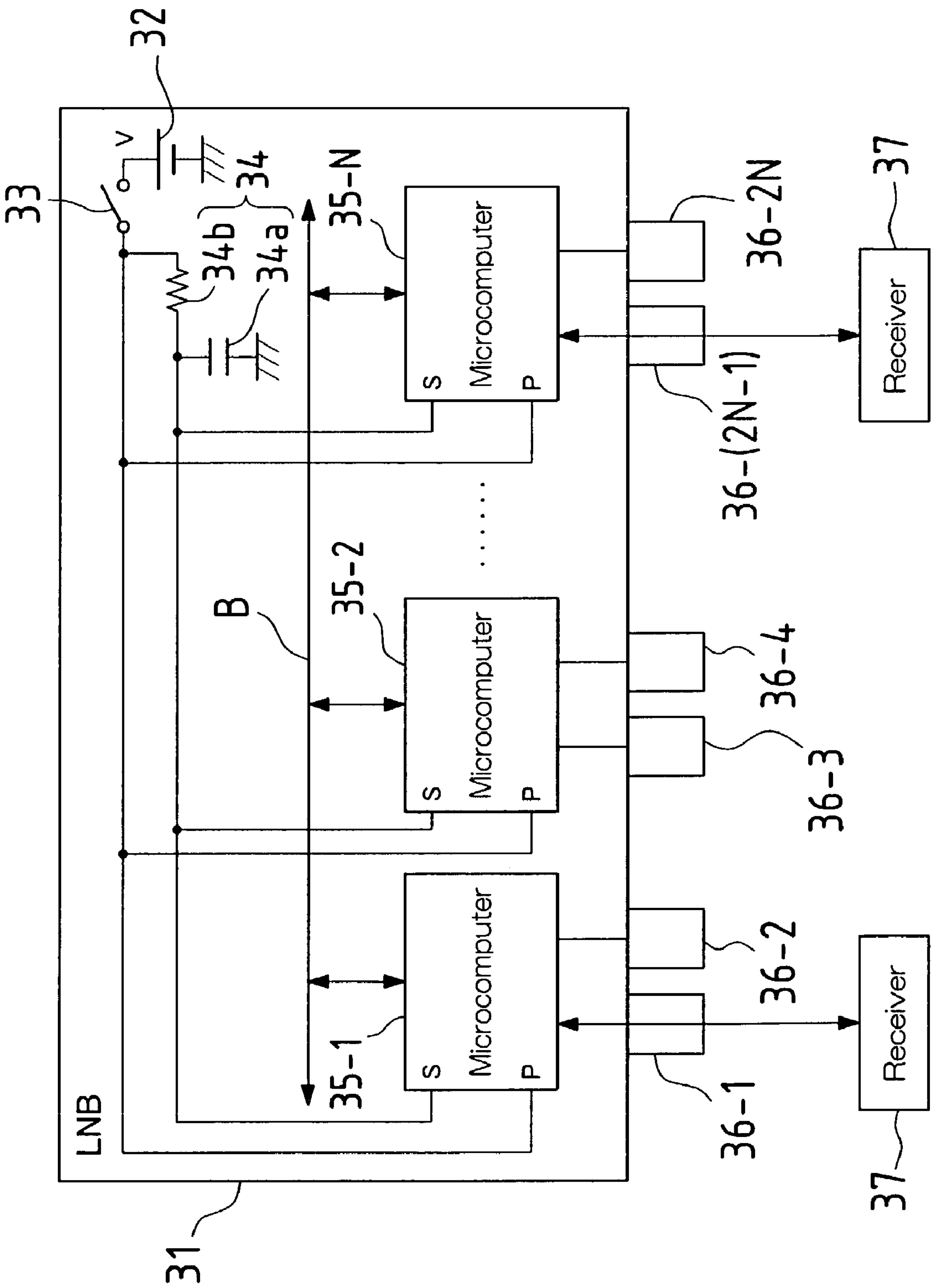
FIG. 3 is a block diagram showing a third embodiment associated with the LNB of the present invention.

FIG. 3 shows in schematic fashion the structure of an LNB in accordance with a third embodiment of the present invention. LNB 31 of the present embodiment is equipped with power supply 32; power switch 33; CR time constant circuit 34; microcomputers 35-1 through 35-N, these being N in number; I/O ports 36-1 through 36-2N, these being 2N in number; and bus B.

This LNB 31 is also attached to a feeder horn of a parabolic antenna for use in receiving satellite broadcasts, the received signal undergoing frequency conversion, and the signal produced as a result of such frequency conversion being sent from respective I/O ports 36-1 through 36-2N to respective receivers 37 by way of respective coaxial cables (not shown).

Each of microcomputers 35-1 through 35-N is assigned two of respective I/O ports 36-1 through 36-2N. Microcomputer 35-1 is a flash-type master microcomputer, and the serial number of LNB 31 is stored therein in advance as specific information. The other microcomputers 35-2 through 35-N are mask-type slave microcomputers. Use of mask microcomputers permits reductions in the cost of LNB 31 to be achieved.

At LNB 31, power switch 33 intervenes between power supply 32 and power supply terminals P of respective microcomputers 35-1 through 35-N. When power switch 33 is turned ON, power supply voltage V from power supply 32 is supplied to power supply terminals P of respective microcomputers 35-1 through 35-N, enabling operation of respective microcomputers 35-1 through 35-N.

CR time constant circuit 34, being a circuit comprising capacitor 34*a* and resistor 34*b*, intervenes between power switch 33 and reset terminals S of respective microcomputers 35-1 through 35-N.

Figure 4:
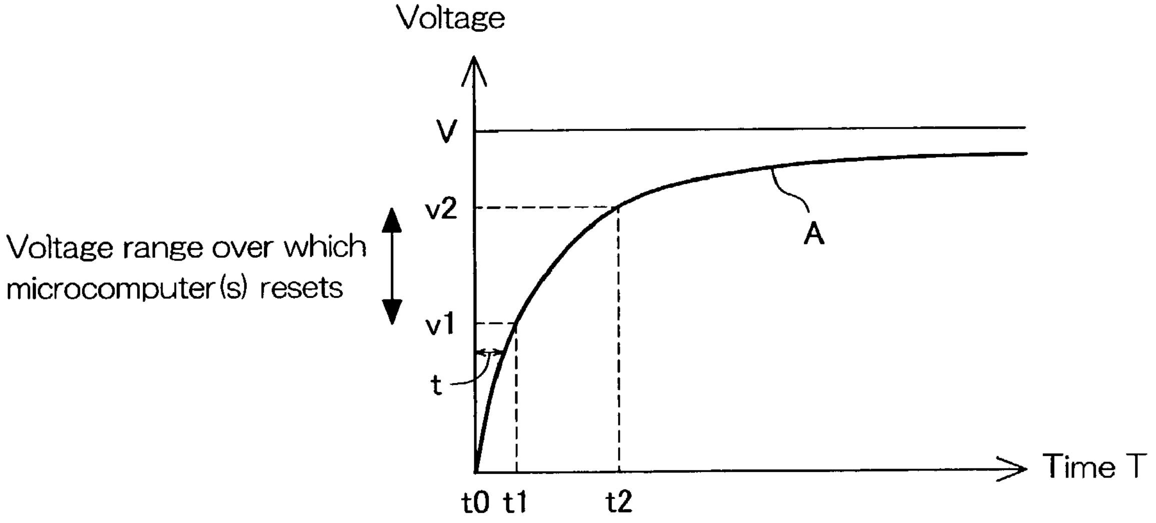
FIG. 4 contains (a) a drawing showing output characteristics of a CR time constant circuit in the LNB shown in FIG. 3, and (b) a graph showing output characteristics of a CR time constant circuit when the time constant thereof is increased.
Figure 4:
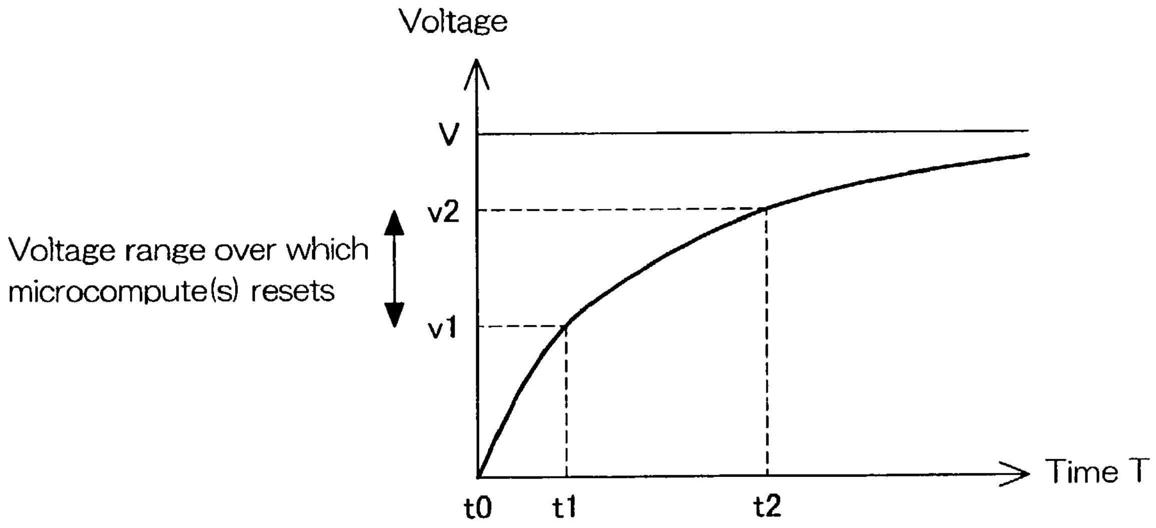

FIG. 4(*a*) is a graph showing output characteristics of a CR time constant circuit 34. As shown at FIG. 4(*a*), when power switch 33 is turned ON at time t0, power supply voltage V from power supply 32 is supplied to power supply terminals P of respective microcomputers 35-1 through 35-N. Furthermore, power supply voltage V from power supply 32 is applied to CR time constant circuit 34, and the voltage output from CR time constant circuit 34 rises rapidly as indicated by characteristics curve A.

The voltage output from CR time constant circuit 34 is applied to reset terminals S of respective microcomputers 35-1 through 35-N, respective microcomputers 35-1 through 35-N being reset and initialized, and respective microcomputers 35-1 through 35-N being restarted, when reset voltage(s) is or are reached.

Figure 5:
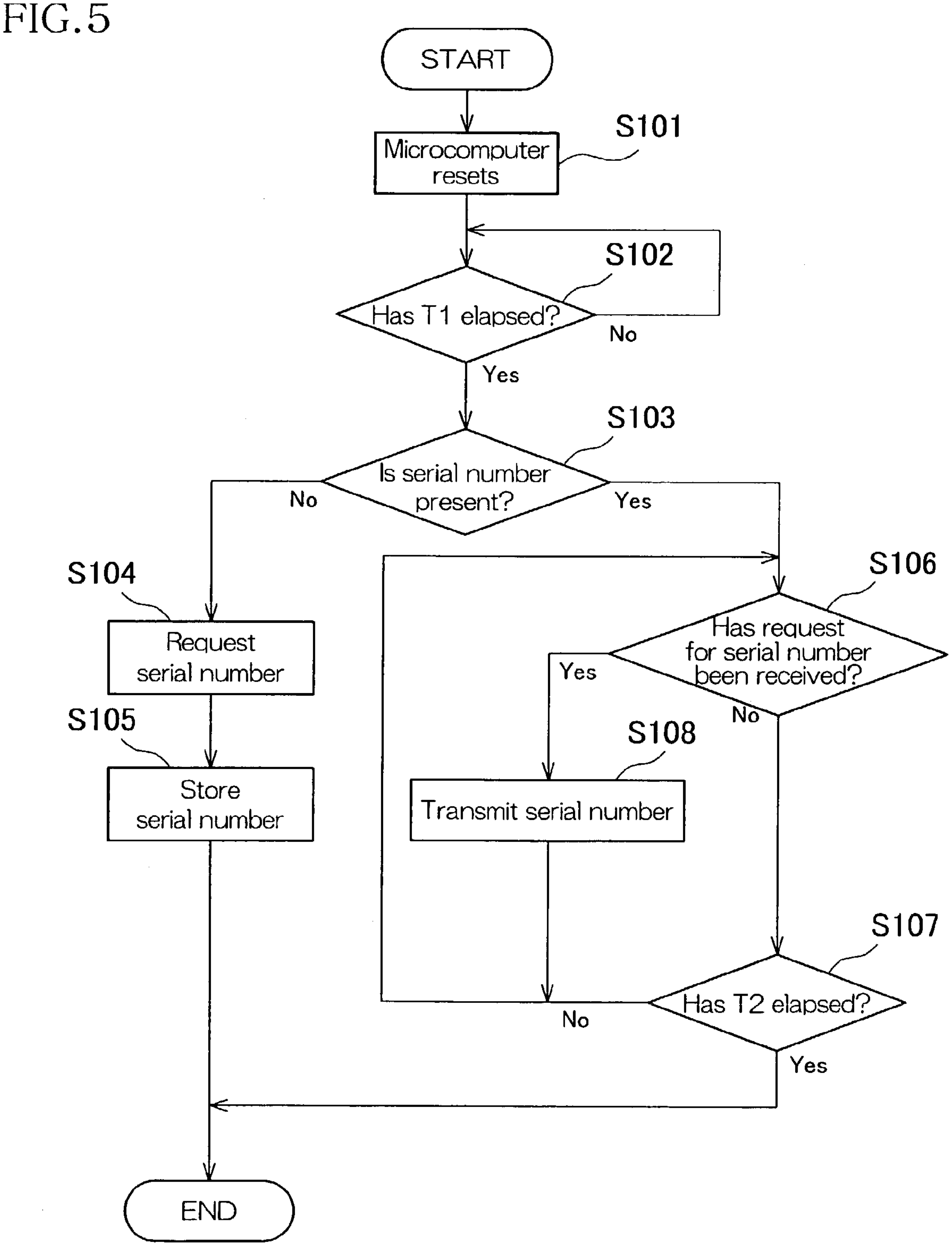
FIG. 5 is a flowchart diagram showing processing for transfer of specific information between or among respective microcomputers in the LNB shown in FIG. 3.

At LNB 31, following resetting of respective microcomputers 35-1 through 35-N, any of respective microcomputers 35-1 through 35-N may carry out the processing in the flowchart at FIG. 5, causing the serial number of LNB 31 to be transferred between or among respective microcomputers 35-1 through 35-N. Next, processing operations for such transfer of specific information between or among respective microcomputers is described with reference to the flowchart shown in FIG. 5.

At LNB 31, after resetting of microcomputer(s) is completed (step S101), microcomputer(s) enter a wait state for fixed time T1 ("No" at step S102), and after fixed time T1 has elapsed ("Yes" at step S102), the microcomputer(s) determine whether the serial number of LNB 31 is stored at that or those microcomputer(s) (step S103).

If, for example, a particular microcomputer is a slave microcomputer and the serial number of LNB 31 is not stored therein ("No" at step S103), then that microcomputer might inquire for the serial number of LNB 31 from another, master microcomputer by way of bus B (step S104). In addition, the slave microcomputer might acquire the serial number of LNB 31 from the master microcomputer by way of bus B and might store this serial number of LNB 31 (step S105).

Or if a particular microcomputer is a master microcomputer, because it will have the serial number of LNB 31 stored therein ("Yes" at step S103), then that microcomputer might await inquiry for the serial number of LNB 31 from slave microcomputer(s) for a period lasting a fixed time T2 from the time at which resetting is completed ("No" at steps S106 and step S107). In addition, in the event that there is or are inquiry or inquiries from slave microcomputer(s) ("Yes" at step S106), the master microcomputer might provide the serial number of LNB 31 to the slave microcomputer(s) by way of bus B (step S108). Furthermore, at the master microcomputer, processing for transferring the serial number of LNB 31 might terminate after fixed time T2 has elapsed ("Yes" at step S107).

Thus, at LNB 31 of the present embodiment, the serial number of LNB 31 may be stored only at master microcomputer 35-1, the serial number of LNB 31 being transferred from master microcomputer 35-1 to slave microcomputer(s) in response to resetting of respective microcomputers 35-1 through 35-N. Respective slave microcomputers 35-2 through 35-N can therefore obtain the serial number of LNB 31 immediately following resetting, making it possible for it or them to respond immediately with the serial number of LNB 31 in the event that there is or are inquiry or inquiries from receiver(s) 37 for same.

The reset voltage of respective microcomputers 35-1 through 35-N might display a variance encompassing a range of voltages v1 through v2 as shown by way of example in the graph at FIG. 4(*a*). For this reason, if the reset voltage of microcomputer 35-1 is v1, then microcomputer 35-1 will undergo resetting at time t1, when the voltage output from CR time constant circuit 34 reaches reset voltage v1. Furthermore, if the reset voltage of microcomputer 35-N is v2, then microcomputer 35-N will undergo resetting at time t2, when the voltage output from CR time constant circuit 34 reaches reset voltage v2. Accordingly, this will cause the timing with which respective microcomputers 35-1 through 35-N undergo resetting to exhibit a differential.

In order to expedite the progress of the aforementioned processing operations for transfer of specific information between or among respective microcomputers 35-1 through 35-N shown in the flowchart of FIG. 5, it will be necessary to wait a period corresponding to the reset time of the slowest microcomputer. Accordingly, fixed time T1 at step S102 in the flowchart at FIG. 5 must be made large. However, the greater the delay in carrying out the processing in the flowchart at FIG. 5 the greater will be the time that must pass from the turning ON of power switch 33 until respective microcomputers 35-1 through 35-N can begin operating.

The time constant of CR time constant circuit 34 may therefore be set to a small value so as to increase the speed with which the output voltage at CR time constant circuit 34 rises. It is preferred that this be done so as to permit the difference between time t1 at which microcomputer 35-1 undergoes resetting and time t2 at which microcomputer 35-N undergoes resetting to be made small, decreasing the timing differential between or among respective microcomputers 35-1 through 35-N and decreasing the time from the turning ON of power switch 33 until time t2, which represents the reset time of the slowest microcomputer.

If the time constant of CR time constant circuit 34 were to be made large, retarding the rise in the output voltage at CR time constant circuit 34, this would cause the difference between time t1 at which microcomputer 35-1 undergoes resetting and time t2 at which microcomputer 35-N undergoes resetting to increase as shown in the graph at FIG. 4(*b*), increasing the time from the turning ON of power switch 33 until time t2, which represents the reset time of the slowest microcomputer, and increasing the time that must pass from the turning ON of power switch 33 until respective microcomputers 35-1 through 35-N can begin operating.

Moreover, at LNB 31, there is no objection to employing flash microcomputers for respective microcomputers 35-2 through 35-N. Doing so will permit flexibility in accommodating changes in software.

Figure 6:
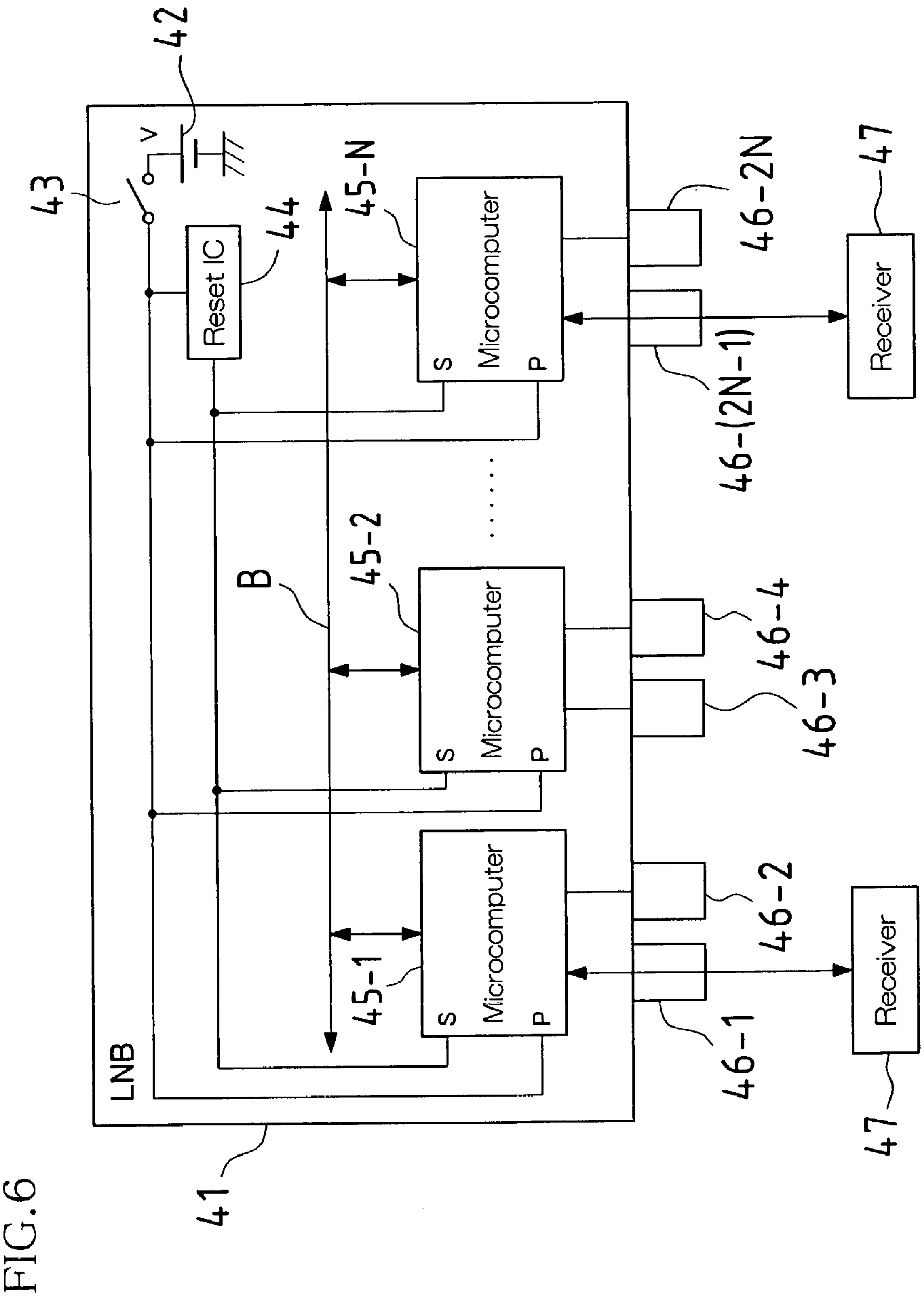
FIG. 6 is a block diagram showing a fourth embodiment associated with the LNB of the present invention.

FIG. 6 shows in schematic fashion the structure of an LNB in accordance with a fourth embodiment of the present invention. LNB 41 of the present embodiment is equipped with power supply 42; power switch 43; reset IC 44; microcomputers 45-1 through 45-N, these being N in number; I/O ports 46-1 through 46-2N, these being 2N in number; and bus B.

LNB 41 is also attached to a feeder horn of a parabolic antenna for use in receiving satellite broadcasts, the received signal undergoing frequency conversion, and the signal produced as a result of such frequency conversion being sent from respective I/O ports 46-1 through 46-2N to respective receivers 47.

Microcomputer 45-1 is a flash-type master microcomputer, and the serial number of LNB 41 is stored therein in advance as specific information. The other respective microcomputers 45-2 through 45-N are mask-type slave microcomputers.

Furthermore, power switch 43 intervenes between power supply 42 and power supply terminals P of respective microcomputers 45-1 through 45-N. When power switch 43 is turned ON, power supply voltage V from power supply 42 is supplied to power supply terminals P of respective microcomputers 45-1 through 45-N, enabling operation of respective microcomputers 45-1 through 45-N.

Reset IC 44 intervenes between power switch 43 and reset terminals S of respective microcomputers 45-1 through 45-N.

Here, when power switch 43 is turned ON, power supply 42 is put into electrical contact with reset IC 44 and power supply terminals P of respective microcomputers 45-1 through 45-N, and the power supply voltage V of power supply 42 rises rapidly. When the power supply voltage has risen to a sufficient level, reaching a threshold value, reset IC 44 applies reset voltage(s) to reset terminals S of respective microcomputers 45-1 through 45-N. This causes respective microcomputers 45-1 through 45-N to be reset and initialized, restarting respective microcomputers 45-1 through 45-N.

As was the case with LNB 31, LNB 41 is also such that following resetting of respective microcomputers 45-1 through 45-N the processing at the flowchart shown in FIG. 5 is carried out, the serial number of LNB 41 being transferred from master microcomputer 45-1 to the other respective microcomputers 45-2 through 45-N, these being slave microcomputers.

Here, in resetting the microcomputers, it is necessary that reset voltage(s) be applied to microcomputer reset terminal(s) only after a fixed time has elapsed so as to allow power supply voltage to rise to a sufficient level. If reset voltage(s) is or are applied to microcomputer reset terminal(s) before such fixed time has elapsed, microcomputers will not undergo resetting despite application thereof.

Because LNB 41 of the present embodiment employs reset IC 44, the fact that reset IC 44 permits increase in the accuracy with which power supply voltage can be detected makes it possible to adjust threshold(s) as compared with power supply voltage(s). Furthermore, the increased accuracy of the reset voltage(s) output from reset IC 44 also permits adjustment of reset voltage(s). This therefore permits more assured resetting of respective microcomputers 45-1 through 45-N.

Note also that where a CR time constant circuit is used, reset voltage output will track the rise in the power supply voltage at power supply 32. For this reason, whereas when power supply voltage V at FIG. 4(*a*) rises rapidly it will be possible to accommodate fixed time T1 from the time that the power supply voltage starts to rise until the time that the voltage output from the CR time constant circuit reaches reset voltage(s), when power supply voltage V rises slowly the voltage output from the CR time constant circuit will track this slowly rising power supply voltage V. In such a case it can be expected that there will be difficulty in accommodating fixed time T1, but there will be no such difficulty if a reset IC is employed.

Moreover, at LNB 41, there is in addition no objection to employing flash microcomputers for respective microcomputers 45-2 through 45-N. Doing so will permit flexibility in accommodating changes in software.

Figure 7:
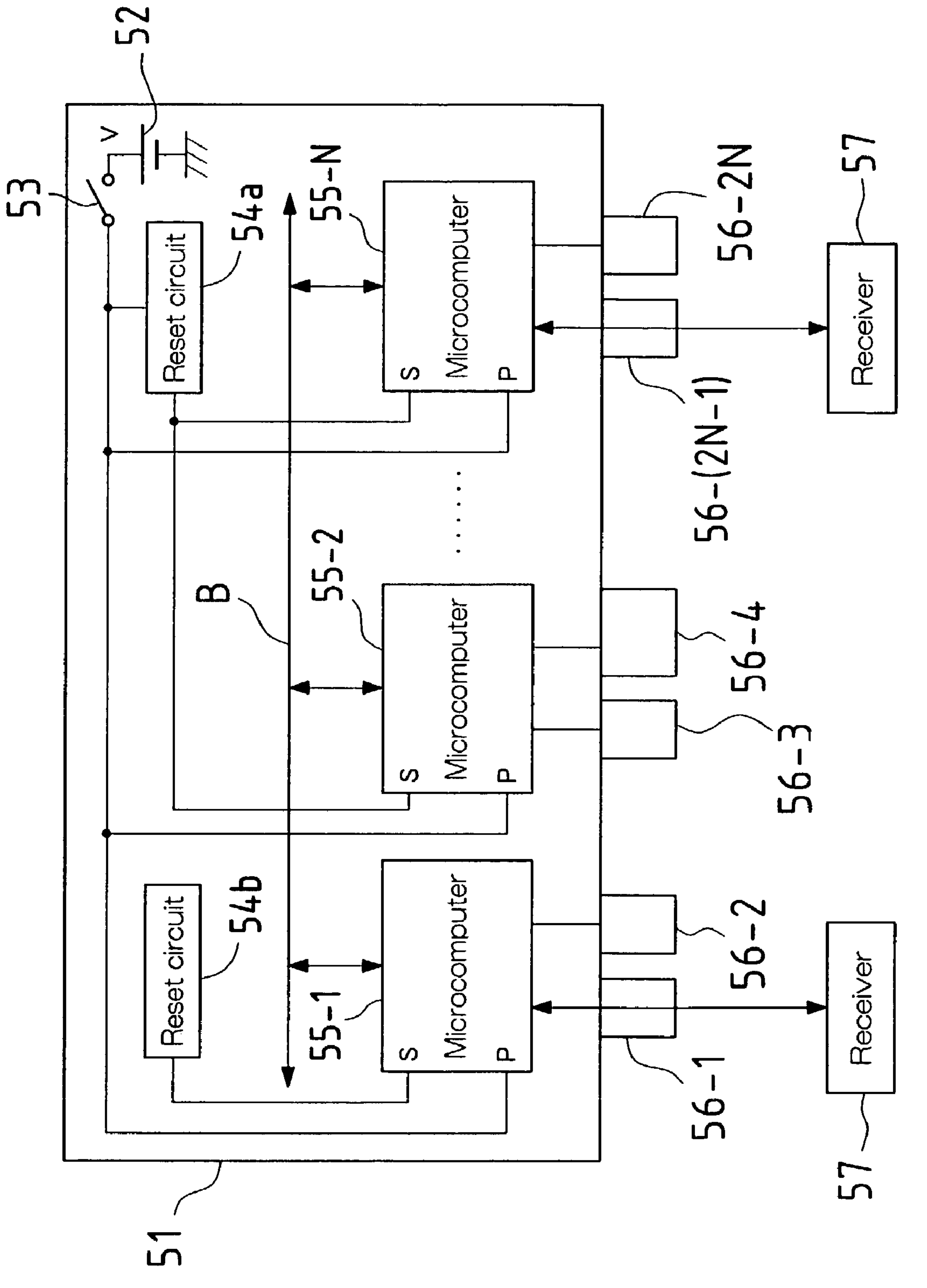
FIG. 7 is a block diagram showing a fifth embodiment associated with the LNB of the present invention.

FIG. 7 shows in schematic fashion the structure of an LNB in accordance with a fifth embodiment of the present invention. LNB 51 of the present embodiment is equipped with power supply 52; power switch 53; plurality of reset circuits 54*a*, 54*b* comprising CR time constant circuit(s) and/or reset IC(s); microcomputers 55-1 through 55-N, these being N in number; I/O ports 56-1 through 56-2N, these being 2N in number; and bus B.

This LNB 51 is also attached to a feeder horn of a parabolic antenna for use in receiving satellite broadcasts, the received signal undergoing frequency conversion, and the signal produced as a result of such frequency conversion being sent from respective I/O ports 56-1 through 56-2N to respective receivers 57.

Microcomputer 55-1 is a flash-type master microcomputer, and the serial number of LNB 51 is stored therein in advance as specific information. The other respective microcomputers 55-2 through 55-N are mask-type slave microcomputers.

Reset circuit 54*a* intervenes between power switch 53 and reset terminals S of respective microcomputers 55-2 through 55-N. Furthermore, reset circuit 54*b* intervenes between power switch 53 and reset terminal S of microcomputer 55-1.

Here, because it is not possible to provide line(s) which would connect reset terminal S of microcomputer 55-1 in common with reset terminals S of the other respective microcomputers 55-2 through 55-N on the board(s) which make up LNB 51, two reset circuits 54*a*, 54*b* have been arranged in distributed fashion on the board(s), the respective microcomputers 55-1 through 55-N being made to undergo resetting by virtue of the fact that the output of reset circuit 54*b* is applied to reset terminal S of microcomputer 55-1 and the output of reset circuit 54*a* is applied to reset terminals S of the other respective microcomputers 55-2 through 55-N.

When power switch 53 is turned ON, power supply voltage V from power supply 52 is supplied to power supply terminals P of respective microcomputers 55-1 through 55-N, enabling operation of respective microcomputers 55-1 through 55-N, and power supply 52 is moreover put into electrical contact with respective reset circuits 54*a*, 54*b*. In addition, output from respective reset circuits 54*a*, 54*b* causes respective microcomputers 55-1 through 55-N to be reset and initialized, restarting respective microcomputers 55-1 through 55-N.

As was the case with LNB 31, LNB 51 is also such that following resetting of respective microcomputers 55-1 through 55-N the processing at the flowchart shown in FIG. 5 is carried out, the serial number of LNB 51 being transferred from master microcomputer 55-1 to the other respective microcomputers 55-2 through 55-N, these being slave microcomputers.

In the event that reset circuits 54*a*, 54*b* are CR time constant circuits, it will be possible to set the timing with which resetting of respective microcomputers 55-1 through 55-N occurs by adjusting the time constant(s) of the CR time constant circuits. If, for example, time constant(s) of CR time constant circuit(s) is or are made small, voltage(s) output by CR time constant circuit(s) will rise rapidly as shown at FIG. 4(*a*), making it possible to achieve fast reset timing at respective microcomputers 55-1 through 55-N. Furthermore, if time constant(s) of CR time constant circuit(s) is or are made large, voltage(s) output by CR time constant circuit(s) will rise more gradually as shown at FIG. 4(*b*), making it possible to achieve slow reset timing at respective microcomputers 55-1 through 55-N.

Here, the greater the time constant(s) of the CR time constant circuit(s), the greater will be the extent to which any variance in the value(s) of C and/or any variance in the value(s) of R manifest themselves as variance in CR time constant circuit output rise time(s). What this suggests is that this could result in increased disagreement in the timing with which respective reset circuits 54*a*, 54*b* cause resetting of respective microcomputers 55-1 through 55-N. It is therefore preferred that the time constants of the respective CR time constant circuits be made small so as to minimize any disagreement in the timing with which resetting of respective microcomputers 55-1 through 55-N occurs.

Moreover, at LNB 51, there is no objection to employing flash microcomputers for respective microcomputers 55-2 through 55-N. Doing so will permit flexibility in accommodating changes in software.

Figure 8:
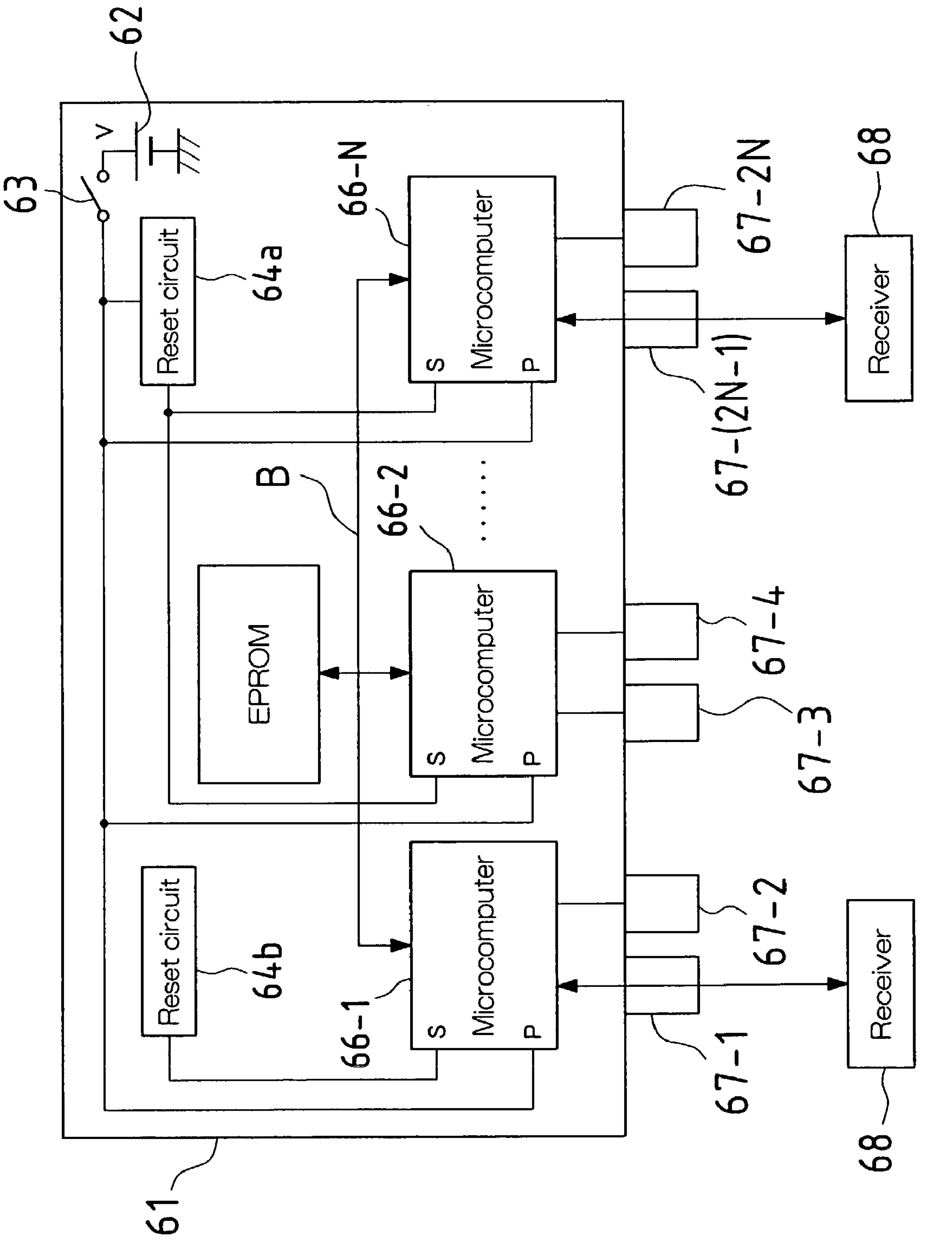
FIG. 8 is a block diagram showing a sixth embodiment associated with the LNB of the present invention.
Figure 9:
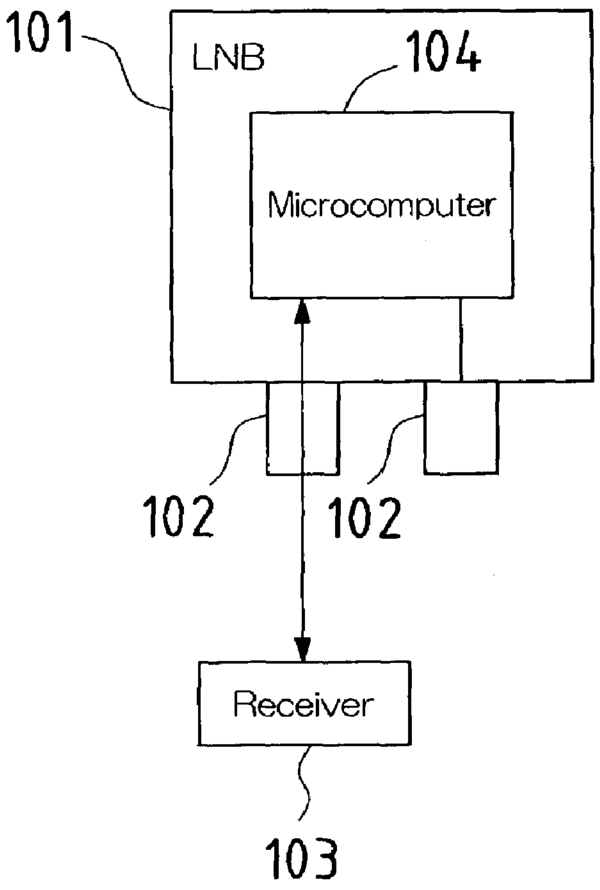
FIG. 9 is a block diagram showing an example of a conventional LNB.
Figure 10:
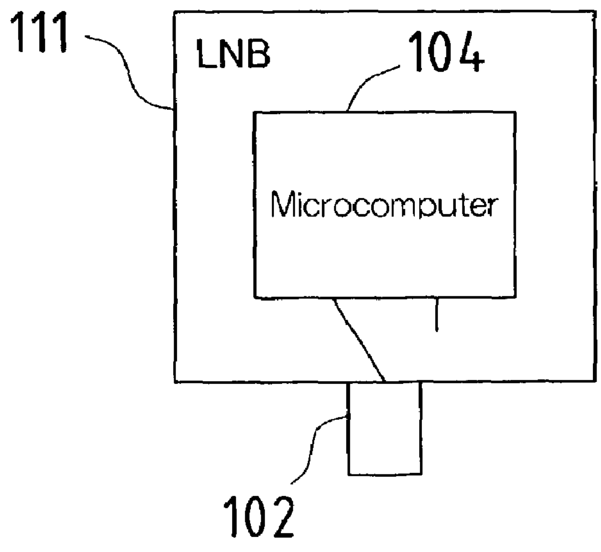
FIG. 10 is a block diagram showing another example of a conventional LNB.
Figure 11:
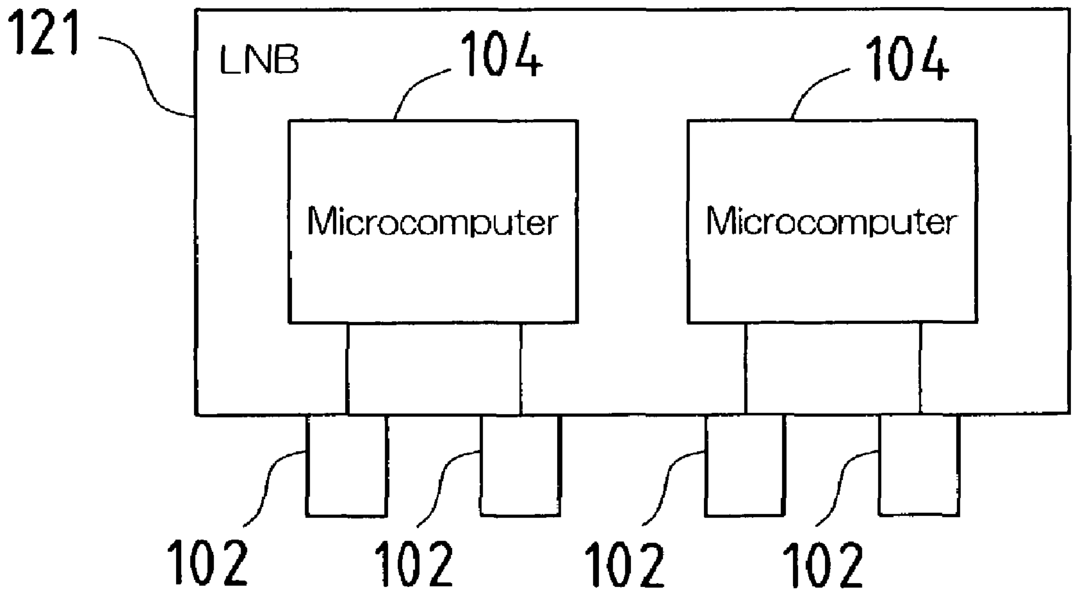
FIG. 11 is a block diagram showing a different example of a conventional LNB.

FIG. 8 shows in schematic fashion the structure of an LNB in accordance with a sixth embodiment of the present invention. LNB 61 of the present embodiment is equipped with power supply 62; power switch 63; plurality of reset circuits 64*a*, 64*b* comprising CR time constant circuit(s) and/or reset IC(s); EPROM 65; microcomputers 66-1 through 66-N, these being N in number; I/O ports 67-1 through 67-2N, these being 2N in number; and bus B.

This LNB 61 is also attached to a feeder horn of a parabolic antenna for use in receiving satellite broadcasts, the received signal undergoing frequency conversion, and the signal produced as a result of such frequency conversion being sent from respective I/O ports 67-1 through 67-2N to respective receivers 68.

The serial number of LNB 61 is written in advance to EPROM 65.

Respective microcomputers 66-1 through 66-N are mask-type slave microcomputers.

Reset circuit 64*a* intervenes between power switch 63 and reset terminals S of respective microcomputers 66-2 through 66-N. Furthermore, reset circuit 64*b* intervenes between power switch 63 and reset terminal S of microcomputer 65-1.

When power switch 63 is turned ON, power supply voltage V from power supply 62 is supplied to power supply terminals P of respective microcomputers 66-1 through 66-N, enabling operation of respective microcomputers 66-1 through 66-N, and power supply 62 is moreover put into electrical contact with respective reset circuits 64*a*, 64*b*. In addition, output from respective reset circuits 64*a*, 64*b* causes respective microcomputers 66-1 through 66-N to be reset and initialized, restarting respective microcomputers 66-1 through 66-N.

Upon being restarted as a result of resetting, respective microcomputers 66-1 through 66-N access EPROM 65 by way of bus B, read the serial number of LNB 61 from EPROM 65, and store this specific information.

Thus, at LNB 61 of the present embodiment, the serial number of LNB 61 may be stored only at EPROM 65, the serial number of LNB 61 being transferred from EPROM 65 to respective microcomputers 66-1 through 66-N in response to resetting of respective microcomputers 66-1 through 66-N. Respective microcomputers 66-1 through 66-N can therefore obtain the serial number of LNB 61 immediately following resetting, making it possible for them to respond immediately with the serial number of LNB 61 in the event that there is or are inquiry or inquiries from receiver(s) 68 for same.

Moreover, in the event that it is possible to provide line(s) connecting reset terminal S of microcomputer 66-1 in common with reset terminals S of the other respective microcomputers 66-2 through 66-N on the board(s) which make up LNB 61, only one reset circuit need be provided.

Furthermore, at LNB 61, there is no objection to employing flash microcomputers for respective microcomputers 66-1 through 66-N. Doing so will permit flexibility in accommodating changes in software.

The present invention may be embodied in a wide variety of forms other than those presented herein without departing from the spirit or essential characteristics thereof. The foregoing embodiments and working examples, therefore, are in all respects merely illustrative and are not to be construed in limiting fashion. The scope of the present invention being as indicated by the claims, it is not to be constrained in any way whatsoever by the body of the specification. All modifications and changes within the range of equivalents of the claims are moreover within the scope of the present invention.

Moreover, the present application claims right of benefit of prior filing dates of Japanese Patent Application No. 2002-161646 and Japanese Patent Application No. 2003-116042, the content of both of which is incorporated herein by reference in its entirety. Furthermore, all references cited in the present specification are specifically incorporated herein by reference in their entirety.

What is claimed is:

1. A low noise blockdown converter accepting input of one or more signals received by means of one or more substantially parabolic antennas, carrying out frequency conversion on at least one of the received signal or signals, and sending at least one signal produced as a result of this frequency conversion to one or more receivers, comprising:

a plurality of microcomputers; said plurality of microcomputers comprising one master microcomputer and at least one slave microcomputer; wherein information specific for said low noise blockdown converter is shared by at least two of said plurality of microcomputers and stored at the master microcomputer; and at least a portion of the specific information is transferred from the master microcomputer to at least one of the slave microcomputer or microcomputers.

2. A low noise blockdown converter according to claim 1, wherein at least one of the microcomputers is a flash microcomputer.

3. A low noise blockdown converter according to claim 1, wherein the master microcomputer is a flash microcomputer, and at least one of the slave microcomputer or microcomputers is a mask microcomputer.

4. A low noise blockdown converter according to claim 1, wherein responsive to one or more inquiries for said specific information from at least one of the receiver or receivers, at least one of the slave microcomputer or microcomputers accepts said specific information from the master microcomputer and sends at least a portion of this specific information to at least one of the receiver or receivers inquiring for same.

5. A low noise blockdown converter according to claim 1, wherein responsive to turning ON power to said low noise blockdown converter, at least one of the slave microcomputer or microcomputers accepts and saves said specific information from the master microcomputer.

6. A low noise blockdown converter accepting input of one or more signals received by means of one or more substantially parabolic antennas, carrying out frequency conversion on at least one of the received signal or signals, and sending at least one signal produced as a result of this frequency conversion to one or more receivers, comprising:

a plurality of microcomputers and one or more specific information storage memories in which information specific to said low noise blockdown converter is shared by at least two of said plurality of microcomputers and is stored; wherein at least a portion of the specific information is transferred from at least one of the specific information storage memory or memories to at least one of the microcomputer or microcomputers.

7. A low noise blockdown converter according to claim 6, wherein at least one of the microcomputers is a mask microcomputer.

8. A low noise blockdown converter according to claim 6, wherein responsive to one or more inquiries for said specific information from at least one of the receiver or receivers, at least one of the microcomputers reads said specific information from at least one of the specific information storage memory or memories and sends at least a portion of this specific information to at least one of the receiver or receivers inquiring for same.

9. A low noise blockdown converter according to claim 6, wherein responsive to turning ON power to said low noise blockdown converter, at least one of the microcomputers reads and saves said specific information from at least one of the specific information storage memory or memories.

10. A low noise blockdown converter accepting input of one or more signals received by means of one or more substantially parabolic antennas, carrying out frequency conversion on at least one of the received signal or signals, and sending at least one signal produced as a result of this frequency conversion to one or more receivers, comprising:

a plurality of microcomputers, the respective reset terminals, at least two of which are connected in common; said plurality of microcomputers comprising one master microcomputer and at least one slave microcomputer; wherein information specific for said low noise blockdown converter is shared by at least two of said plurality of microcomputers and is stored at the master microcomputer; and responsive to resetting of at least one of the microcomputers, at least a portion of the specific information is transferred from the master microcomputer to at least one of the slave microcomputer or microcomputers.

11. A low noise blockdown converter according to claim 10, wherein at least one of the microcomputers is a flash microcomputer.

12. A low noise blockdown converter according to claim 10, wherein the master microcomputer is a flash microcomputer, and at least one of the slave microcomputer or microcomputers is a mask microcomputer.

13. A low noise blockdown converter according to claim 10, wherein said low noise blockdown converter is equipped with one or more CR time constant circuits, at least one of which accepts input of one or more power supply voltages, at least a portion of the microcomputers being made to undergo resetting as a result of application of at least one output from at least one of the CR time constant circuit or circuits to at least one of the microcomputer reset terminals.

14. A low noise blockdown converter according to claim 10, wherein said low noise blockdown converter is equipped with one or more reset ICs, at least one of which accepts input of one or more power supply voltages, at least two of the microcomputers being made to undergo resetting as a result of application of at least one output from at least one of the IC or ICs to at least one of the microcomputer reset terminals.

15. A low noise blockdown converter accepting input of one or more signals received by means of one or more substantially parabolic antennas, carrying out frequency conversion on at least one of the received signal or signals, and sending at least one signal produced as a result of this frequency conversion to one or more receivers, comprising:

a plurality of microcomputers and a plurality of reset means for resetting at least two of said plurality of microcomputers; said plurality of microcomputers comprising one master microcomputer and at least one slave microcomputer; wherein information specific for said low noise blockdown converter is shared by at least two of said plurality of microcomputers and is stored at the master microcomputer; and responsive to resetting of at least two of the microcomputers by at least a portion of the reset means, at least a portion of the specific information is transferred from the master microcomputer to at least one of the slave microcomputer or microcomputers.

16. A low noise blockdown converter according to claim 15, wherein at least a portion of the reset means is or are, respectively, CR time constant circuit or circuits, at least one of which accepts input of one or more power supply voltages; and at least two of the microcomputers are made to undergo resetting as a result of application in distributed fashion of outputs respectively routed from at least a portion of the respective CR time constant circuit or circuits to at least two of the respective microcomputers.

17. A low noise blockdown converter according to claim 15, wherein at least a portion of the reset means is or are, respectively, equipped with reset IC or ICs, at least one of which accepts input of one or more power supply voltages; and at least two of the microcomputers is or are made to undergo resetting as a result of application in distributed fashion of output or outputs respectively routed from at least a portion of the respective reset IC or ICs to at least two of the respective microcomputers.

18. A low noise blockdown converter accepting input of one or more signals received by means of one or more substantially parabolic antennas, carrying out frequency conversion on at least one of the received signal or signals, and sending at least one signal produced as a result of this frequency conversion to one or more receivers, comprising:

a plurality of microcomputers, the respective reset terminals of at least two of which are connected in common, and one or more specific information storage memories in which information specific for said low noise blockdown converter is shared by at least two of said plurality of microcomputers and is stored; wherein responsive to resetting of at least one of the microcomputers, at least a portion of the specific information is transferred from at least one of the specific information storage memory or memories to at least one of the microcomputer or microcomputers.

19. A low noise blockdown converter accepting input of one or more signals received by means of one or more substantially parabolic antennas, carrying out frequency conversion on at least one of the received signal or signals, and sending at least one signal produced as a result of this frequency conversion to one or more receivers, comprising:

a plurality of microcomputers, a plurality of reset means for resetting at least two of said plurality of microcomputers, and one or more specific information storage memories in which information specific to said low noise blockdown converter is shared by at least two of said plurality of microcomputers and is stored; wherein responsive to resetting of at least two of the microcomputers by at least a portion of the reset means, at least a portion of the specific information is transferred from at least one of the specific information storage memory or memories to at least one of the microcomputer or microcomputers.

* * * * *

UNITED STATES PATENT AND TRADEMARK OFFICE

CERTIFICATE OF CORRECTION

PATENT NO. : 7,111,082 B2 
APPLICATION NO. : 10/452578
DATED : September 19, 2006
INVENTOR(S) : Okahashi It is certified that error appears in the above-identified patent and that said Letters Patent is hereby corrected as shown below:

On the title page,

[*] Notice: Subject to any disclaimer, the term of this patent is extended or adjusted under 35 USC 154(b) by (343) days Delete the phrase “by 343” and insert -- by 442 days--

Signed and Sealed this

Eleventh Day of September, 2007

JON W. DUDAS
*Director of the United States Patent and Trademark Office*